(12) United States Patent
Seideman et al.

(10) Patent No.: US 11,544,229 B1
(45) Date of Patent: Jan. 3, 2023

(54) ENHANCED TRACKING OF DATA FLOWS

(71) Applicant: American Express Travel Related Services Company, Inc., New York, NY (US)

(72) Inventors: Jeremy D. Seideman, Brooklyn, NY (US); Amartya Roy, Monmouth Junction, NJ (US); Anna Korsakova Bain, East Northport, NY (US); Jaime Amanda Spahr, Peoria, AZ (US); Paramjit Singh, Scottsdale, AZ (US); Pratiti Shrivastava, Jersey City, NJ (US); Siva Nidamarthy, Phoenix, AZ (US); Tami Sue Sargeant, Glendale, AZ (US); George Kassabov, Lakewood Ranch, FL (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 175 days.

(21) Appl. No.: 16/861,771

(22) Filed: Apr. 29, 2020

(51) Int. Cl.
*G06F 7/00* (2006.01)
*G06F 16/182* (2019.01)
*H04L 9/06* (2006.01)
*G06F 11/30* (2006.01)

(52) U.S. Cl.
CPC ...... *G06F 16/1837* (2019.01); *G06F 11/3086* (2013.01); *H04L 9/0637* (2013.01)

(58) Field of Classification Search
CPC ............. G06F 16/1837; G06F 11/3086; G06F 16/112; G06F 16/254; G06F 16/2308; G06F 16/1865; H04L 9/0637
See application file for complete search history.

(56) References Cited

U.S. PATENT DOCUMENTS

| | | | | |
|---|---|---|---|---|
| 7,058,928 | B2 * | 6/2006 | Wygodny | G06F 11/3636 714/E11.212 |
| 8,825,798 | B1 * | 9/2014 | Johnson | G06Q 20/385 709/217 |
| 10,114,857 | B1 * | 10/2018 | Nikitina | G06F 21/6227 |
| 10,148,533 | B1 * | 12/2018 | Hull | G06F 11/3476 |
| 10,282,268 | B1 * | 5/2019 | Cherian | G06F 11/3082 |
| 10,466,869 | B2 * | 11/2019 | Liu | G06T 11/60 |
| 10,467,426 | B1 * | 11/2019 | Esposito | G06F 16/9024 |
| 10,805,069 | B1 * | 10/2020 | Irwan | H04L 63/0442 |

(Continued)

*Primary Examiner* — Mohammed R Uddin
(74) *Attorney, Agent, or Firm* — Thomas Horstemeyer, LLP (57) ABSTRACT

Disclosed are various embodiments for tracking the flow of data through a network environment. A monitor can detect that a data transaction event has occurred. Then, the monitor can identify data involved in the data transaction event. Next, a trace identifier can be assigned to the data involved in the data transaction event. Subsequently, a transaction data subset representing a subset of the data involved in the data transaction event that is subject to a common data processing event can be identified. Then, a span identifier can be assigned to the transaction data subset. Next, a correlation identifier can be link to a combination of the span identifier and the trace identifier. Finally, a transaction event record can be written to a distributed ledger, the transaction event record comprising the span identifier and the transaction data subset.

20 Claims, 5 Drawing Sheets

(56) References Cited

U.S. PATENT DOCUMENTS

| | | | |
|---|---|---|---|
| 11,023,909 B1* | 6/2021 | Badger | G06Q 30/0255 |
| 11,153,396 B2* | 10/2021 | Rogynskyy | G06F 16/2264 |
| 2005/0097149 A1* | 5/2005 | Vaitzblit | G06F 21/6227 |
| 2011/0254731 A1* | 10/2011 | Musmeci | G01S 5/0027 |
| | | | 342/357.25 |
| 2014/0019423 A1* | 1/2014 | Liensberger | G06F 16/2365 |
| | | | 707/690 |
| 2014/0297846 A1* | 10/2014 | Hoja | H04L 43/10 |
| | | | 709/224 |
| 2015/0287005 A1* | 10/2015 | Hanson | G06Q 30/06 |
| | | | 705/40 |
| 2016/0117471 A1* | 4/2016 | Belt | G16H 20/10 |
| | | | 705/2 |
| 2016/0315975 A1* | 10/2016 | Lin | G06Q 10/06 |
| 2017/0046526 A1* | 2/2017 | Chan | G06Q 20/0655 |
| 2017/0116306 A1* | 4/2017 | Kapoor | G06F 16/283 |
| 2017/0214675 A1* | 7/2017 | Johnsrud | H04L 9/3236 |
| 2018/0121420 A1* | 5/2018 | Onusko | G06F 16/248 |
| 2019/0043050 A1* | 2/2019 | Smith | G06Q 20/223 |
| 2019/0081796 A1* | 3/2019 | Chow | H04L 9/30 |
| 2019/0123889 A1* | 4/2019 | Schmidt-Karaca | |
| | | | H04L 63/0442 |
| 2019/0207759 A1* | 7/2019 | Chan | H04L 9/14 |
| 2019/0229890 A1* | 7/2019 | Brehmer | H04L 9/3242 |
| 2019/0236559 A1* | 8/2019 | Padmanabhan | G06F 21/64 |
| 2019/0258821 A1* | 8/2019 | Holmberg | G06Q 30/0201 |
| 2019/0266502 A1* | 8/2019 | Moser | G06F 11/079 |
| 2019/0339668 A1* | 11/2019 | Biernat | H04L 9/3239 |
| 2019/0340269 A1* | 11/2019 | Biernat | G06F 16/27 |
| 2020/0327137 A1* | 10/2020 | Farver | G06F 16/1805 |
| 2021/0133209 A1* | 5/2021 | Griffin | G06N 5/04 |

\* cited by examiner

ENHANCED TRACKING OF DATA FLOWS

BACKGROUND

Applications and databases are routinely configured to write information about their activities to a log. The level of detail provided by the log is often quite detailed. Such information can include what actions were performed by an application, what queries were received from or executed by a database, and other relevant information. However, databases are often unable to track what happens to data stored in the database once the data is returned in response to a query or is migrated to another database. As a result, a database is unable to continue logging what happens to the data. Similarly, a database is often unable to track the lifecycle of data prior to the data being imported or otherwise entered into the database. As a result, an organization may find it technically difficult to monitor or track how data is used as it flows between applications or databases based on the logs generated by those application or databases.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for tracking the flow of data through an organization's information technology infrastructure. As data enters an organization, a monitoring application records its ingestion. The record of the ingestion can be written to a distributed database to provide an auditable and tamper-resistant record of the transaction. As the data is accessed or processed (e.g., reformatted, accessed by an application, moved to other data stores or computer systems, updated, deleted, etc.), records of these events are recorded in the distributed database. The distributed database can then be queried to pull records of the transactions in order to trace or follow the data as it moves from system to system and database to database within an organization's information technology infrastructure.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
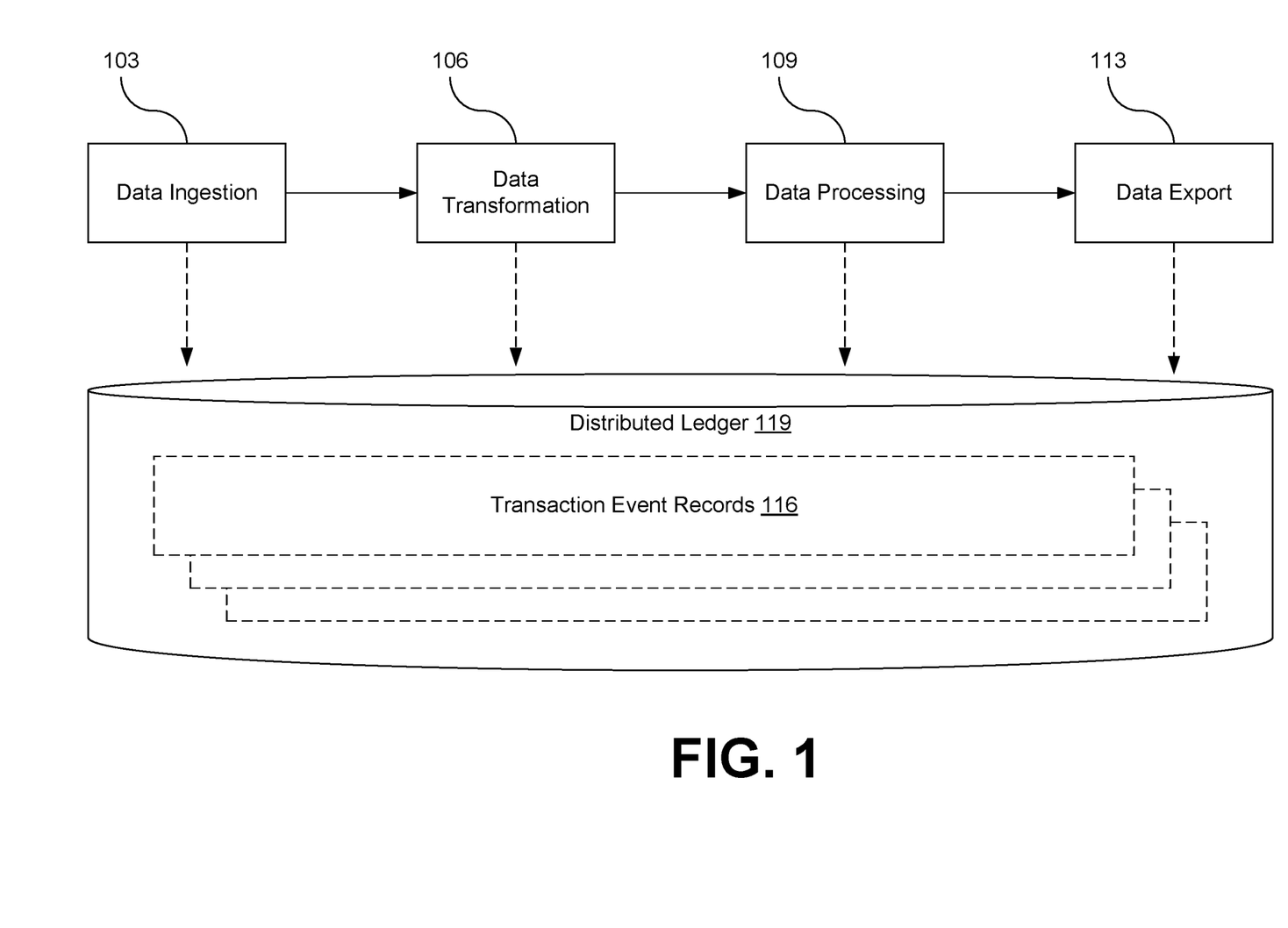
FIG. 1 is a drawing depicting one of several embodiments of the present disclosure.

FIG. 1 provides an illustrative example depicting the various embodiments of the present disclosure. As data moves through an organization, it may proceed through various stages of a data life-cycle. For example, data may be ingested at block 103 (e.g., a dataset imported from a source external to the organization). Once ingested, the data could be transformed or otherwise converted into a format suitable for use by the organization at block 106. Once the data is appropriately formatted, it can be used for various purposes at block 109 (e.g., as the basis for reports, analytics, machine-learning model training, etc.). In some instances, the data may even be exported (e.g., to a third party) at block 113. At each of these stages, information about how the data is being accessed, updated, or modified can be recorded in a transaction event record 116. Each transaction event record 116 may be stored in a distributed ledger 119 to provide an immutable and globally accessible repository of the transaction event records 116. Accordingly, any entity, application, or computing device with access to the distributed ledger 119 can track with granularity the lifecycle of data within the organization.

The distributed ledger 119 represents a synchronized, eventually consistent, data store spread across multiple nodes in different geographic or network locations. Each node in the distributed ledger 119 can contain a replicated copy of the distributed ledger 119, including all data stored in the distributed ledger 119. Records of transactions involving the distributed ledger 119 can be shared or replicated using a peer-to-peer network connecting the individual nodes that form the distributed ledger 119. Once a transaction or record is recorded in the distributed ledger 119, it can be replicated across the peer-to-peer network until the record is eventually recorded with all nodes. Various consensus methods can be used to ensure that data is written reliably to the distributed ledger 119. Examples of a distributed ledger can include blockchains, distributed hash tables (DHTs), and similar data structures.

Figure 2:
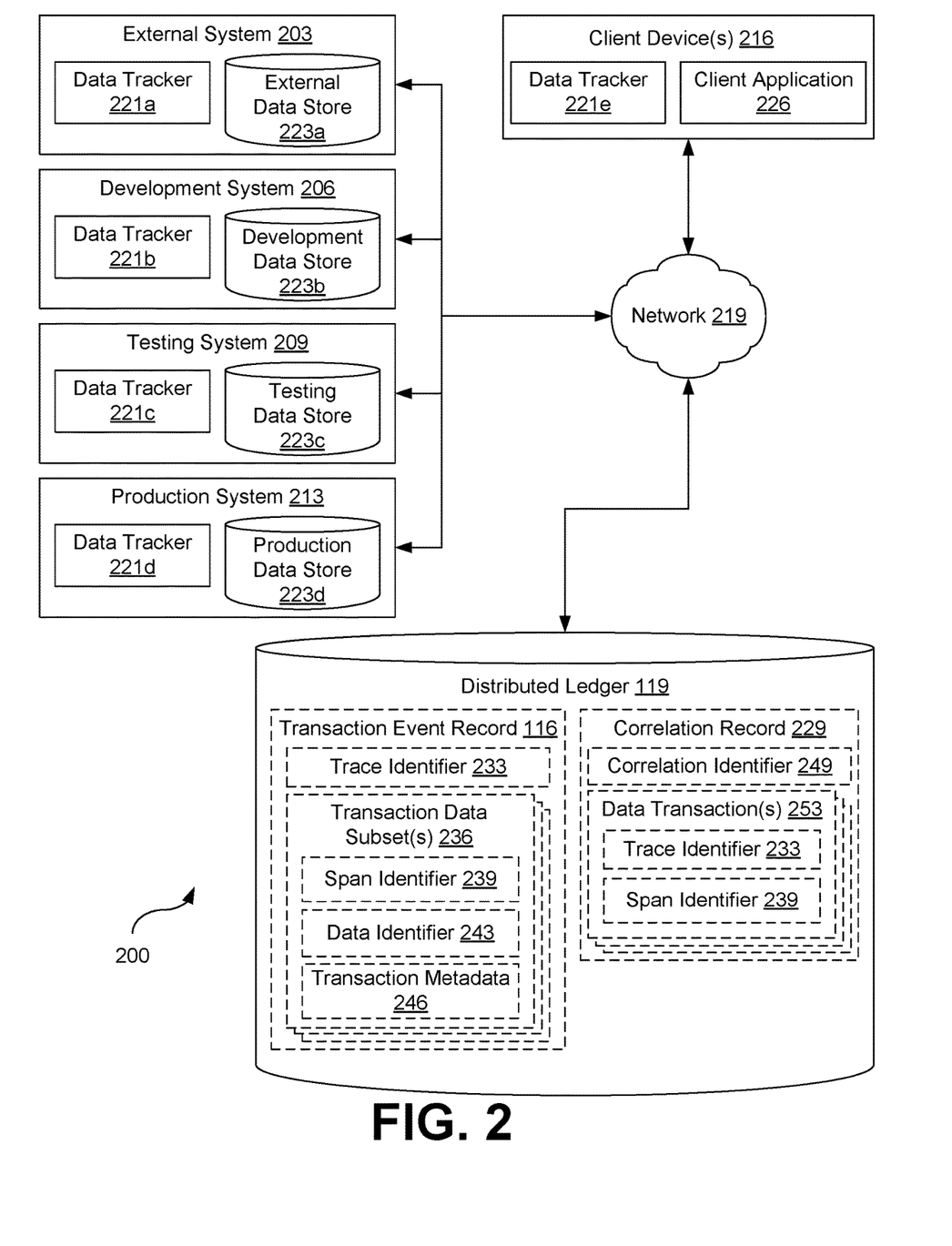
FIG. 2 is a drawing of a network environment according to various embodiments of the present disclosure.

With reference to FIG. 2, shown is a network environment 200 according to various embodiments. The network environment 200 can include various computing systems or devices. Examples of computing systems or computing devices include the external system 203, the development system 206, the testing system 209, the production system 213, and one or more client devices 216. In addition, multiple computing systems or computing devices may be used as nodes to host a distributed ledger 119. These systems and devices can be in data communication with each other via a network 219.

The network 219 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 219 can also include a combination of two or more networks 219. Examples of networks 219 can include the Internet, intranets, extranets, virtual private networks (VPNs), and similar networks.

Computing systems or computing devices, such as the external system 203, the development system 206, the testing system 209, can include one or more computing devices that include a processor, a memory, and/or a network interface. For example, the computing devices can be configured to perform computations on behalf of other computing devices or applications. As another example, such computing devices can host and/or provide content to other computing devices in response to requests for content. These computing systems or computing devices can be located in a single installation or can be distributed among many different geographical locations. In some cases, one or more of the computing devices or systems can correspond to a virtual machine or an elastic computing resource where the allotted capacity of processing, network, storage, or other computing-related resources can vary over time.

Each computing system may be configured to execute a data tracker 221 and implement a data store 223. For example, the external system 203 can host a data tracker 221a and an external data store 223a, the development system 206 can host a data tracker 221b and a development data store 223b, the testing system 209 can host a data tracker 221c and a testing data store 223c, and the production system 213 can host a data tracker 221d and a production data store 223d. The data tracker 221a-e may be referred to collectively as data trackers 221 or generically as the data tracker 221. Likewise, the external data store 223a, development data store 223b, the testing data store 223c, and the production data store 223d may be referred to collectively as the data stores 223 or generically as the data store 223. Examples of data stores 223 include relational databases or non-relational databases such as object-oriented databases, hierarchical databases, directory services (e.g., MICROSOFT ACTIVE DIRECTORY® or other lightweight directory access protocol (LDAP) services), hash tables or similar key-value data stores, as well as other data storage applications or data structures (e.g., flat files). Moreover, combinations of these databases, data storage applications, and/or data structures may be used together to provide a single, logical, data store 223.

The data trackers 221 may be installed on computing devices connected to the network 219 to monitor accesses of data stored in the data stores 223. Accordingly, the data trackers 221 may create and store transaction event records 116 in the distributed ledger 119 as data stored in a data store 223 is accessed, stored, modified, copied, or deleted. The data trackers 221 may monitor the data stores 223 to identify and record these events using various approaches. For example, a data tracker 221 may be configured to monitor a log for a data store 223. As new events are recorded in the log, the data tracker 221 may create and store respective transaction event records 116 in the distributed ledger 119. As another example, the data trackers 221 could implement an application programming interface (API) which can be invoked by the data stores 223. For example, each time an event occurs that is related to data stored in a data store 223, the data store 223 could invoke a function provided by the API to notify the data tracker 221 of the occurrence of the event and details about the event. Other approaches may also be implemented as appropriate for particular data stores 223.

The client device(s) 216 are representative of a plurality of client devices 216 that can be coupled to the network 219. A client device 219 can include a computer system with a processor, a memory, and various other components. Such a computer system can be embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability. The client device 219 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 216 or can be connected to the client device 216 through a wired or wireless connection.

The client device 216 can be configured to execute various applications such as a client application 223 or other applications. The client application 223 can be executed in a client device 216 to access data stored in a data store 223 or in the distributed ledger 119, thereby rendering a user interface on the display of the client device 216 to manipulate, process, analyze, or visualize the accessed data. To this end, the client application 226 can include a browser, a dedicated application, or other executable, and the user interface can include a web page, an application screen, or other user mechanism for obtaining user input. The client device 216 can be configured to execute applications beyond the client application 216 such as email applications, social networking applications, word processors, spreadsheets, or other applications.

The distributed ledger 119 may also be in data communication with the data trackers 221 or the client application 226. For example, the distributed ledger 119 may store transaction event records 116 or correlation records 229 that are created by data trackers 221. The distributed ledger 119 may also make the transaction event records 116 or correlation records 229 available in response to searches or queries (e.g., to trace the flow of individual records or sets of data through various systems).

The transaction event record 116 represents a record of how data in a data store 223 is being accessed, updated, or modified. Accordingly, individual transaction event records 116 can represent all data involved in a single, common data transaction event. For example, when data is accessed by an application, a transaction event record 116 could be created that specifies which data was accessed, where the data was located, and the application or user that accessed the data. In a similar example, a transaction event record 116 could be created when data is modified, specifying which data was modified, which data store 223 the data was located in, what kind of modifications were made, and the application or user making the modification. As another example, a transaction event record 116 could be created when data is moved from one data store 223 to another data store 223. In this case the transaction event record 116 could specify which data was moved, the application or user that caused the data to move, and the source data store 223 and the destination data store 223. Although these examples are provided for illustrative purposes, any event or interaction with data stored in a data store 223 can be recorded as a transaction event record 116. Accordingly, a transaction event record 116 can include a trace identifier 233 and one or more transaction data subsets 236.

The trace identifier 233 acts to uniquely identify a transaction event record 116 with respect to other transaction event records 116. Accordingly, the trace identifier 233 could be implemented as an incremental counter or as a hash of the transaction data subsets 236 included in the transaction event record 116.

A transaction data subset 236 represents information related to data that is involved in a transaction and is subject to a common data processing event. Data may be considered to be subject to a common data processing event if all items of data are subject to the same operation. For example, if a subset of the rows in a database table were updated as part of the same query, the subset of the rows would be considered to be subject to a common data processing event. In a simple transaction, the transaction event record 116 may contain a single transaction data subset 236 that represents all of the data in a transaction. This might occur, for example, when data is transferred between systems in bulk. However, in more complicated examples, multiple transaction data subsets 236 could be present in a single transaction event record 116. This might occur, for example, when multiple rows in a relational database are accessed by a client application 226, and a subset of the rows are modified. In such an example, a first transaction data subset 236 could represent the subset of rows that are accessed, but unmodified. A second transaction data subset 236 could represent the subset of rows that are accessed and modified. Accordingly, individual transaction data subsets 236 can include a span identifier 239, a data identifier 243, and transaction metadata 246.

The span identifier 239 uniquely identifies an individual transaction data subset 236 with respect to other transaction data subsets 236. In some instances, the span identifier 239 could be derived from a respective trace identifier 233. For instance, a prefix or suffix could be added to the trace identifier 233 to generate a unique span identifier 239. As another example, a counter or other variable could be incremented to create a new span identifier 239 as desired. Other approaches could also be used as desired in particular implementations.

The data identifier 243 represents the data included in the transaction data subset 236. For example, if the data is located in a table in a database, the data identifier 243 could specify the database name, table name, rows, columns, and/or individual cells in a table. As another example, the data identifier 243 could specify the file name or file names being processed, or specific byte ranges or byte offsets within a file or set of files. Likewise, the data identifier 243 could specify individual objects in an object-oriented data store (e.g., objects in a directory service) or attributes of objects. Other types of data identifiers 243 may be used for other types of data stores, and different types of data transactions may involve different levels of granularity for the data identifier 243.

The transaction metadata 246 includes metadata related to the common data processing event. This metadata can describe how the data was used, accessed, or modified during the transaction. For example, the metadata could include the time of the transaction, the data store 223 in which the data is located, the data store 223 that the data was moved to (if applicable), the application (e.g., client application 226) or system (e.g., external system 203, development system 206, testing system 209, production system 213, or client device 216) that accessed or modified the data, the nature of the access (e.g., whether the data was read, modified, updated, or deleted), and/or the purpose for accessing the data (e.g., as the basis for a report, for training a machine-learning model, for data analytics, as an input for an application, etc.). Any other relevant information appropriate for a particular implementation may also be stored in the transaction metadata 246.

The correlation record 229 can act as a record that identifies or correlates events involving the same data or sets of data. Accordingly, the correlation record 229 can allow an application or a user to track or trace the flow of data through the network environment 200 as it moves from one system or data store 223 to another system or data store 223 and as it is accessed and modified by various applications. Individual correlation records 229 can include a correlation identifier 249 and one or more data transactions 253.

The correlation identifier 249 is an identifier that uniquely represents a correlation record 229 with respect to other correlation records 229. For example, a correlation identifier 249 could be based on or derived from a counter that is incremented each time a new correlation record 229 is created and stored in the distributed ledger 119. As another example, the correlation identifier 249 could be generated from a cryptographic hash of the data transactions 253 stored in or linked to the correlation record 229.

A data transaction 253 represents an individual event involving data stored in a data store 223. Accordingly, the data transaction 253 may include both a trace identifier 233 of a specific transaction event record 116 and a span identifier 239 representing a transaction data subset 236. The combination of the trace identifier 233 and the span identifier 239 allows for the data transaction 253 to identify an individual operation performed on data at a specific point in time. Because multiple data transactions 253 are stored in association with the correlation identifier 249, a single correlation record 229 can reflect the history of data is it flows between data stores 223 or systems and is accessed by various applications or users.

Next, a general description of the operation of the various components of the network environment 200 is provided. Although the following paragraphs provide an illustrative example of the operation of and interaction between the individual components of the network environment 200, the individual components may operate and interact in other manners as well according to various implementations. More detailed descriptions are provided in the discussion accompanying the subsequent FIGS. 3-5.

To begin, data trackers 221 can be installed on various systems connected to the network 219. For those third-party systems that are not under the control of the operator of the data trackers 221, such as an external system 203, the third-party operator may install a data tracker 221. Alternatively, a data tracker 221 may be installed at an ingress point for data that may be imported from an external system 203 (e.g., at an edge computing device that provides functionality for importing data from an external system 203).

A data tracker 221 installed on a system can monitor a data store 223 hosted by the respective system. For example, the data tracker 221 may monitor a log for the data store 223 to identify events or transactions involving data stored in the data store 223. As another example, the data tracker 221 could provide an API or a message passing interface (MPI). The data store 223 could invoke a function provided by the API or send a message to the MPI to notify the data tracker 221 of the occurrence of an event or transaction involving data stored in the data store 223.

When a data tracker 221 identifies that an event involving data in the data store 223 has occurred, the data tracker 221 can create a transaction event record 116 to represent the event. For example, the data tracker 221 could identify the data involved (e.g., rows, columns, and/or cells in a table; byte-ranges or offsets in file; indices of an array; etc.); the nature of the transaction; and the parties, applications, or systems involved in the transaction. The data tracker 221 could then generate and store a transaction event record 116 in the distributed ledger 119. The data tracker 221 could also create a correlation record 229 or update an existing correlation record 229 to include a data transaction 253.

As previously illustrated and discussed in FIG. 1, several data trackers 221 may generate a series of related transaction event records 116 which, when analyzed together, allow for data to be tracked as it moves within an organization's information technology infrastructure (e.g., the network environment 200). For example, a data tracker 221*a* installed on or in communication with an external system 203 may detect that data from an external data store 223*a* is being exported from the external data store 223*a* and imported into another data store 223 (e.g., a development data store 223*b*). The data tracker 221*a* could create and record a transaction event record 116 reflecting this transfer and detailed information about the transfer.

Meanwhile another data tracker 221, such as the data tracker 221*b* could detect that the data has been imported into the development data store 223*b*. As the data is used in the development data store 223*b* to develop new applications or as the basis for research, accesses of or modifications to the data in the development data store 223*b* could be detected by the data tracker 221*b*. The data tracker 221*b* could then create respective transaction event records 116 for the accesses of or modifications to the data stored in the development data store 223*b*. As data is migrated (e.g., moved, copied, etc.), the migration of the data to another system or data store 223 can be detected by the data tracker 221*b* and a respective transaction event record 116 may be created. For example if data is moved from the development data store 223*b* to the testing data store 223*c*, the data tracker 221*b* could detect the migration and create a respective transaction event record 116. This process could be repeated or replicated by the data tracker 221*c* as data moves into the testing data store 223*c* and by the data tracker 221*d* as data moves into the production data store 223*d*.

Moreover, the data trackers 221*b*, 221*c*, and 221*d* could also record how applications installed on the respective development system 206, testing system 209, and production system 213 processed data retrieved from the development data store 223*b*, testing data store 223*c*, and production data store 223*d*. As a first example, if a machine-learning model executed on the testing system 209 or client device 216 queried a plurality of records from the testing data stores 223*c* for training purposes, the data tracker 221*c* could identify which records were accessed by the machine learning model and/or that the records were accessed for the purpose of training the machine learning model. For a second example, if a billing application executed on the production system 213 each night, the data tracker 221*d* could identify which records the billing application accessed, and note how the records accessed by the billing application were modified, if at all. As another example, if a web site or web application hosted by the production system 213 accessed records in the production data store 223*d*, the data tracker 221*d* could identify which website or web application access the data, what data was accessed, and how the data was used (e.g., to create a response to a request from a client application 226, to create a report for a client application 226, as a response to a database query, etc.).

Similarly, a data tracker 221*e* installed on the client device 216 could identify when a client application 226 accesses data from a data store 223 and generate and store a respective transaction event record 116. For example, the data tracker 221*e* could note what data was requested by the client application 226 and what data was received by the client application 226, the identity or type of client application 226 requesting the data (e.g., a machine-learning model, a web browser, a business intelligence application, etc.), the user account executing the client application 226, the purpose for accessing the data, (e.g., to train a machine-learning model, to create a report rendered within the web browser or business intelligence application, to perform data analytics, etc.). This information could then be included in a respective transaction event record 116 stored in the distributed ledger 119 by the data tracker 221*e*.

Figure 3:
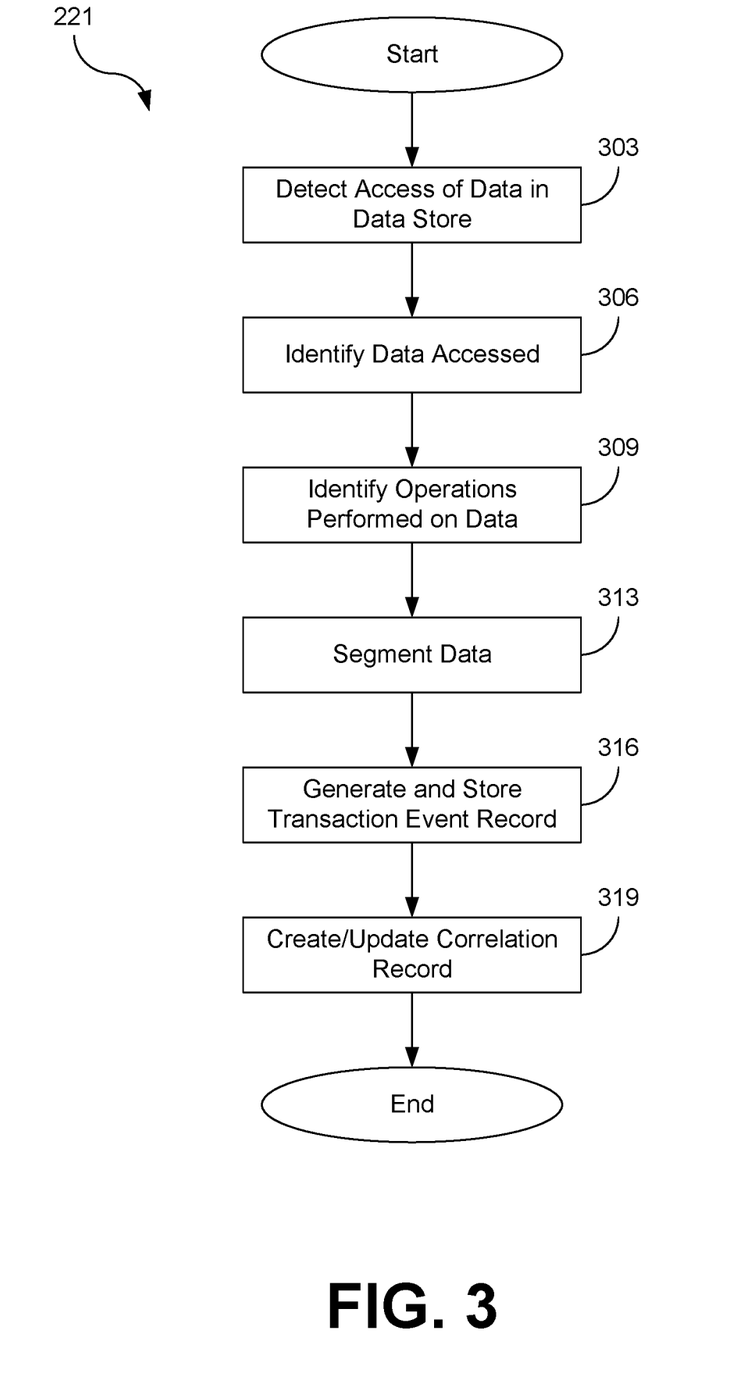
FIG. 3 is a pictorial diagram of an example user interface rendered by a client in the network environment of FIG. 2 according to various embodiments of the present disclosure.

Referring next to FIG. 3, shown is a flowchart that provides one example of the operation of a portion of a data tracker 221 hosted on a system or a computing device that hosts a data store 223. Examples of such data trackers 221 include data trackers 221*a*-221*d*. The flowchart of FIG. 3 provides merely an example of the many different types of functional arrangements that can be employed to implement the operation of the depicted portion of a data tracker 221. As an alternative, the flowchart of FIG. 3 can be viewed as depicting an example of elements of a method implemented within the network environment 200.

Beginning with block 303, a data tracker 221 can detect whether data stored in a data store 223 is being accessed, which would indicate that a data transaction event is occurring. Examples of data accesses that would form a data transaction event include a search of a database or directory service to respond to a query or a search of a filesystem hierarchy to identify a request for a file. The data tracker 221 can use a variety of approaches to detect whether a data transaction event is occurring or has occurred. In one example, the data tracker 221 could periodically or continuously analyze logs generated by a data store 223. If the data store 223 has logged that data has been accessed (e.g., by recording a connection to the data store 223 by another application or recording execution of a query supplied to the data store 223), then the data tracker 221 could use this to detect that data in the data store 223 has been accessed. As another example, the data tracker 221 could be configured to receive messages from the data store 223 each time data in the data store 223 is accessed. For example, the data store 223 could invoke a function in an API provided by the data tracker 221 or provide a message to an MPI provided by the data tracker 221. In each of these cases, the data store 223 could provide information about the data access in the values passed to the function of the API or as a part of the message sent to the MPI. Similarly, the data tracker 221 could monitor access times or modification times recorded in a file system. If the access time or modification time for a file changes, the data tracker 221 could determine that a data access has occurred.

Then at block 306, the data tracker 221 can identify which data was accessed in the data store 223 as part of the data transaction event. For example, the data tracker 221 could review the logs to identify which tables in a data store 223 were accessed in a query and which rows, columns, or cells in the tables were returned in response to the query or modified as a result of the query. For non-tabular or non-relational databases, a similar approach could be used to identify accessed data. However, this information could also be specified in the API call invoked by the data store 223 or the message passed to the data tracker by the data store 223.

Next at block 309, the data tracker 221 can identify which operations were performed on the data accessed at block 306. For example, the data tracker 221 could parse a database query to determine whether data was read (e.g., as the result of structured query language (SQL) SELECT statement or an LDAP SEARCH operation) or modified (e.g., as the result of a SQL INSERT, UPDATE, or DELETE statement or an LDAP ADD, DELETE, or MODIFY operation). This query may be stored in the log of the data store 223, or may have been included in the function call invoked by the data store 223 or the message provide by the data store 223.

Moving on to block 313, the data tracker 221 can segment the data that was accessed into one or more transaction data subsets 236. For example, if an entire table were search in response to a SQL query, but only a subset of the rows were returned in response to the SQL query, the data tracker 221 could segment the data that was accessed into two separate transaction data subsets 236. The first transaction data subset 236 represent the rows in the table that were returned in response to the SQL query. The second transaction data subset 236 could represent those rows in the table that were searched, but were not returned. More complicated queries can result in more extensive transaction data subsets 236 being generated or additional transaction data subsets 236 being generated.

Proceeding to block 316, the data tracker 221 can generate and store a transaction event record 116. For example, the data tracker 221 could create a trace identifier 233 for the transaction event record 116. In addition, for each transaction data subset 236 identified at block 313, a span identifier 239 and a data identifier 243 could be generated. Additionally, transaction metadata 246 for each transaction data subset 236 could be added, such as whether the individual items of data were accessed and/or modified, the query that resulted in the access or modification, the origin of the query, etc. Once created, the data tracker 221 could write or store the transaction event record 116 to the distributed ledger 119.

The data tracker 221 could generate a span identifier 239 through several approaches. For instance, the data tracker 221 could add a prefix or suffix to the trace identifier 233 for the transaction event record 116 to generate a unique span identifier 239. As another example, a counter or other variable could be incremented and the value assigned as a span identifier 239 for a transaction data subset 236. Other approaches could also be used as desired in particular implementations.

If the data is located in a table in a database, the data tracker 221 could generate a data identifier 243 that specifies the database name, table name, rows, columns, and/or individual cells in a table. If the data were stored in files, the data tracker 221 could generate a data identifier 243 could specify the file name or file names accessed, or specific byte ranges or byte offsets within a file or set of files. Likewise, the data tracker 221 could generate a data identifier 243 that specifies individual objects in an object-oriented data store (e.g., objects in a directory service) or attributes of objects. Other types of data identifiers 243 may be created by the data tracker 221 for other types of data stores, and different types of data transactions may involve different levels of granularity for the data identifier 243.

Next at block 319, the data tracker 221 can create a correlation record 229 for the data represented by each transaction data subset or, if an existing correlation record 229 already exists, update the existing correlation record 229. For example, the data tracker 221 could create a new correlation record 229. Accordingly, the data tracker 221 could generate a correlation identifier 249 and create a data transaction 253 that includes the trace identifier 233 for the transaction event record 116 created at block 316 and the span identifier 239 for a transaction data subset 236 included in the transaction event record 116. As another example, the data tracker 221 could search for a correlation record 229 containing a correlation identifier 249 associated with a previous data transaction 253 involving data defined by the data identifier 243. This could include, for example, searching the distributed ledger 119 for a transaction event record 116 with a transaction data subset 236 that includes the data identified by the data identifier 243 from block 316, such as the same sets of tables, rows, columns, file names, file offsets, etc. The span identifier 239 of the respective transaction data subset 236 and the trace identifier 233 of the respective transaction event record 116 could then be used to search for a correlation record 229 with the a data transaction 253 that contains a matching trace identifier 233 and span identifier 239. The data tracker 221 could then add a new data transaction 253 to the matching correlation record 229 that includes the trace identifier 233 and span identifier 239 generated at block 316.

Figure 4:
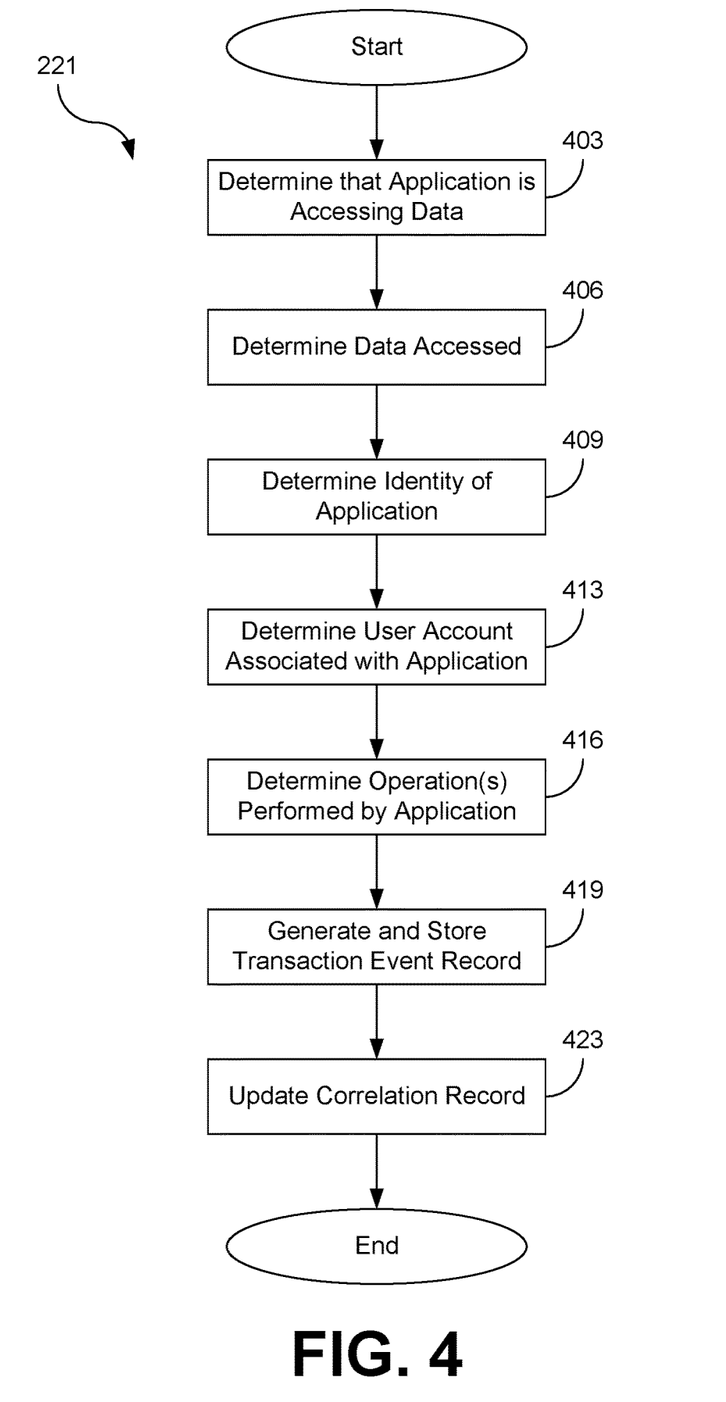
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of a data tracker 221 hosted on a system with an application that requests data from a data store 223 or processes data stored in a data store 223. An example of such a data tracker 221 includes data tracker 221e, which may track which data is accessed by a client application 226 and how that data is used. The flowchart of FIG. 4 provides merely an example of the many different types of functional arrangements that can be employed to implement the operation of the depicted portion of a data tracker 221. As an alternative, the flowchart of FIG. 4 can be viewed as depicting an example of elements of a method implemented within the network environment 200.

Beginning with block 403, a data tracker 221, such as the data tracker 221e, could determine that an application (e.g., client application 226) hosted on a monitored computing device, such as the client device 216 is accessing data stored in a data store 223, which would indicate that the application is initiating a data transaction event. For example, the client application 226 could provide a message or notification to the data tracker 221e indicating that the client application 226 is accessing data. As another example, the data tracker 221e could implement a watchdog process that determines when the client application 226 is accessing a file. In another example, the data tracker 221e could act as proxy through which the client application 226 sends requests to data stores 223, thereby allowing the data tracker 221e to determine when the client application 226 is attempting to access a data store 223.

Then at block 406, the data tracker 221, such as the data tracker 221e, can determine which data was accessed by the application as part of the data transaction event, such as the client application 226. As previously discussed, the data tracker 221e could act as a network proxy through which the client application 226 connects to data stores 223 across the network 219. In this example, the data tracker 221e could read the query or request sent by the client application 226 over the network 219 to a data store 223. As another example, the client application 226 could provide a message or notification to the data tracker 221e identifying the data being accessed, such as a message or notification that specifies the database query sent to a data store 223, the file names and/or byte-offsets of files being accessed locally or in a remote data store 223, etc.

Next at block 409, the data tracker 221 can determine the identity of the application accessing the data. For example, the data tracker 221e could determine a process identifier for the client application 226 requesting access to data. The data tracker 221e could then query the operating system of the client device 216 to determine the identity of the client application 226. As another example, the client application 226 could identify itself to the data tracker 221e (e.g., as part of a message sent to the data tracker 221e identifying the data being accessed by the client application 226).

Moving on to block 413, the data tracker 221 can also determine the user account associated with the application accessing the data. For example, the data tracker 221e could determine a user identifier for the user executing the client application 226. As another example, the data tracker 221e could determine the user credentials used to access the requested data (e.g., the username submitted to a data store 223 in order to execute a query).

Then at block 416, the data tracker 221 can determine what operations were performed on or with the requested data. For example, the data tracker 221e could receive a message from the client application 226 specifying how the requested data was used (e.g., to generate a report and/or the type of report generated, to update one or more records, etc.).

Next at block 419, the data tracker 221 (e.g., data tracker 221e) can generate and store a transaction event record 116 representing the access and use of the data by the application (e.g., client application 226). For example, the data tracker 221 could create a trace identifier 233 for the transaction event record 116. In addition, a span identifier 239 and a data identifier 243 could be generated for a transaction data subset 236 representing the data accessed by the application. Additionally, transaction metadata 246 could be added, such as what data was requested by the application, how it was used by the application, and the identity of the user of the application. Once created, the data tracker 221 could write or store the transaction event record 116 to the distributed ledger 119.

The data tracker 221 could generate a span identifier 239 through several approaches. For instance, the data tracker 221 could add a prefix or suffix to the trace identifier 233 for the transaction event record 116 to generate a unique span identifier 239. As another example, a counter or other variable could be incremented and the value assigned as a span identifier 239 for a transaction data subset 236. Other approaches could also be used as desired in particular implementations.

If the data is located in a table in a database, the data tracker 221 could generate a data identifier 243 that specifies the database name, table name, rows, columns, and/or individual cells in a table. If the data were stored in files, the data tracker 221 could generate a data identifier 243 could specify the file name or file names accessed, or specific byte ranges or byte offsets within a file or set of files. Likewise, the data tracker 221 could generate a data identifier 243 that specifies individual objects in an object-oriented data store (e.g., objects in a directory service) or attributes of objects. Other types of data identifiers 243 may be created by the data tracker 221 for other types of data stores, and different types of data transactions may involve different levels of granularity for the data identifier 243.

Finally at block 423, the data tracker 221 can create a correlation record 229 for the data represented by the transaction data subset 236 or, if an existing correlation record 229 already exists, update the existing correlation record 229. For example, the data tracker 221 could create a new correlation record 229. Accordingly, the data tracker 221 could generate a correlation identifier 249 and create a data transaction 253 that includes the trace identifier 233 for the transaction event record 116 and the span identifier 239 for the transaction data subset 236 included in the transaction event record 116. As another example, the data tracker 221 could search for a correlation record 229 containing a correlation identifier 249 associated with a previous data transaction 253 involving data defined by the data identifier 243. This could include, for example, searching the distributed ledger 119 for a transaction event record 116 with a transaction data subset 236 that includes the data identified by the data identifier 243, such as the same sets of tables, rows, columns, file names, file offsets, etc. The span identifier 239 of the respective transaction data subset 236 and the trace identifier 233 of the respective transaction event record 116 could then be used to search for a correlation record 229 with a data transaction 253 that contains a matching trace identifier 233 and span identifier 239. The data tracker 221 could then add a new data transaction 253 to the matching correlation record 229 that includes the trace identifier 233 and span identifier 239.

Figure 5:
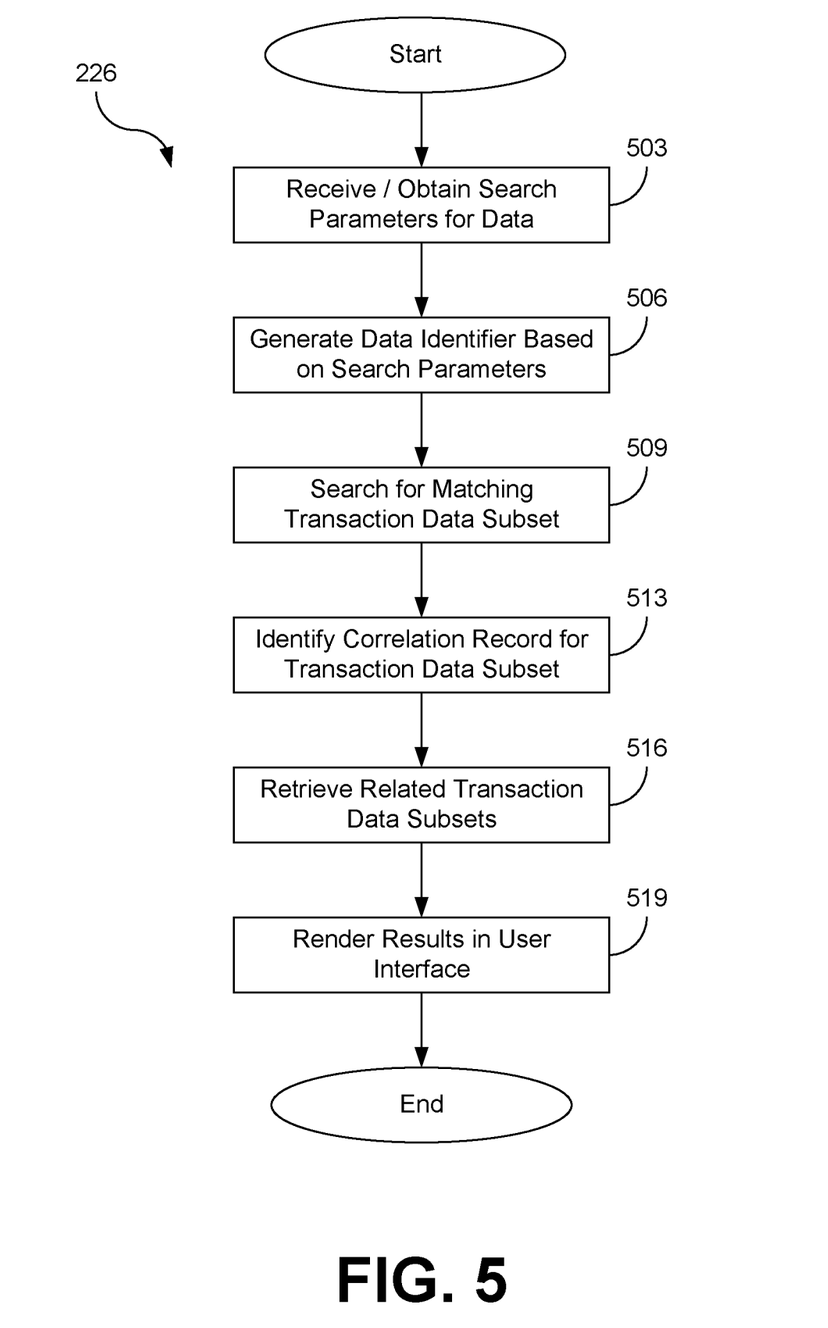
FIG. 5 is a flowchart illustrating one example of functionality implemented as portions of an application executed in a computing environment in the network environment of FIG. 2 according to various embodiments of the present disclosure.

Referring next to FIG. 5, shown is a flowchart that provides one example of the operation of a portion of a client application 226 hosted on a client device 216. The flowchart of FIG. 5 provides merely an example of the many different types of functional arrangements that can be employed to implement the operation of the depicted portion of the client application 226. As an alternative, the flowchart of FIG. 5 can be viewed as depicting an example of elements of a method implemented within the network environment 200.

Beginning with block 503, the client application 226 can receive search parameters for tracing the flow of data through the network environment 200. For example, the client application 226 could receive or otherwise obtain user inputs specifying the data that the user wishes to trace. This could include the names of tables in a database, specific rows or columns in a table, specific cells in a table, file names, specific data in a file, or types or classes of objects in a directory service, specific objects in a directory service, etc.

Then, at block 506, the client application 226 can generate a data identifier 243 that represents the data defined by the search parameters obtained at block 503. The data identifier 243 can be generated by the client application 226 using the same approaches used by the data trackers 221. This can allow the client application 226 to search the distributed ledger 119 for matching transaction data subsets 236.

Next, at block 509, the client application 226 searches for a transaction data subset 236 with a data identifier 243 that matches the data identifier generated at block 506. If a transaction data subset 236 with a matching data identifier 243 is found, then the span identifier 239 for the transaction data subset 236 and the trace identifier 233 for the respective transaction event record 116 are retrieved and the process continues. If no match is found, the process can end.

Moving on to block 513, the client application 226 can use the combination of the trace identifier 233 and the span identifier 239 can to identify a correlation record 229 with a data transaction 253 containing a matching combination of the trace identifier 233 and span identifier 239 retrieved at block 509.

Then, at block 516, the client application 226 can retrieve related transaction data subsets 236. First, the client application 226 can use the data transactions 253 stored in the correlation record 229 to search for transaction event records 116 with trace identifiers 233 that match the trace identifiers 233 in the data transactions 253 associated with the correlation record 229. Second, the client application 226 can identify and retrieve the transaction data subset 236 in the transaction event record 116 with a span identifier 239 matching the span identifier 239 in the data transaction 253 of the correlation record 229.

Finally, at block 519, the client application 226 can render the retrieved transaction data subsets 236 within a user interface to display how the queried data has flowed through the network environment 200. For example, the client application 226 could illustrate when and in response to which conditions that the data moved from one data store 223 to another data store 223 based on the transaction metadata 246 of the retrieved transaction data subsets 236. The client application 226 could also illustrate or specify what happened to the data during each migration between data stores 223 or while the data was hosted by an individual data store 223 (e.g., which queries the data was responsive to, if the data was modified, how the data was modified, who accessed the data, for what purpose the data was accessed, etc.). After rendering the results within a user interface, the process could end until another search was performed.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
detect that a data transaction event has occurred at a data store;
identify data involved in the data transaction event at the data store;
assign a trace identifier to the data involved in the data transaction event, wherein the trace identifier uniquely identifies a transaction event record with respect to other transaction event records;
identify a transaction data subset, the transaction data subset representing a subset of the data involved in the data transaction event that is subject to a common data processing event;
assign a span identifier to the transaction data subset, wherein the span identifier uniquely identifies the transaction data subset with respect to other transaction data subsets;
link a correlation identifier to a combination of the span identifier and the trace identifier;
search a distributed ledger for the transaction data subset to identify a previous span identifier and a previous trace identifier;
identify a correlation record based on the previous span identifier and the previous trace identifier;
write the transaction event record to the distributed ledger that is globally accessible by a user, the transaction event record comprising the trace identifier and the transaction data subset; and
write or update the correlation record at the distributed ledger, the correlation record comprising the correlation identifier, the previous span identifier, the span identifier, the previous trace identifier, and the trace identifier, wherein the correlation record is configured to maintain a history of operations performed on the transaction data subset across different data stores.

2. The system of claim 1, wherein the machine-readable instructions that cause the computing device to detect that the data transaction event has occurred further cause the computing device to at least:
receive, through an application programming interface or a message passing interface provided by the machine-readable instructions, a notification from a data store or an application accessing the data store; and
determine from the notification that the data transaction event has occurred.

3. The system of claim 1, wherein the machine-readable instructions that cause the computing device to detect that the data transaction event has occurred further cause the computing device to at least:
monitor a log associated with the data store; and
determine from the log that the data transaction event has occurred.

4. The system of claim 1, wherein the machine-readable instructions further cause the computing device to at least:
generate a data identifier that identifies the subset of the data by indicating a name or location of an object or file involved in the data transaction event; and
assign the data identifier to the transaction data subset.

5. The system of claim 1, wherein the machine-readable instructions further cause the computing device to at least:
identify metadata associated with the transaction data subset; and
link the metadata to the transaction data subset.

6. The system of claim 5, wherein the machine-readable instructions that cause the computing device to identify the metadata associated with the transaction data subset further cause the computing device to at least:
identify a user account that initiated the data transaction event; and
include an identity of the user account in the metadata.

7. The system of claim 5, wherein the machine-readable instructions that cause the computing device to identify the metadata associated with the transaction data subset further cause the computing device to at least:
identify a destination data store for the data in the transaction data subset; and
include an identifier of the destination data store in the metadata.

8. A computer-implemented method, comprising:
detecting that a data transaction event has occurred at a data store;
identifying data involved in the data transaction event at the data store;
assigning a trace identifier to the data involved in the data transaction event, wherein the trace identifier uniquely identifies a transaction event record with respect to other transaction event records;
identifying a transaction data subset, the transaction data subset representing a subset of the data involved in the data transaction event that is subject to a common data processing event;

assigning a span identifier to the transaction data subset, wherein the span identifier uniquely identifies the transaction data subset with respect to other transaction data subsets;

linking a correlation identifier to a combination of the span identifier and the trace identifier;

searching a distributed ledger for the transaction data subset to identify a previous span identifier and a previous trace identifier;

identifying a correlation record based on the previous span identifier and the previous trace identifier;

writing the transaction event record to the distributed ledger that is globally accessible by a user, the transaction event record comprising the trace identifier and the transaction data subset; and writing or updating the correlation record at the distributed ledger, the correlation record comprising the correlation identifier, the previous span identifier, the span identifier, the previous trace identifier, and the trace identifier, wherein the correlation record is configured to maintain a history of operations performed on the transaction data subset across different data stores.

9. The method of claim 8, wherein detecting that the data transaction event has occurred further comprises:

receiving, through an application programming interface or a message passing interface provided by machine-readable instructions, a notification from a data store or an application accessing the data store; and determining from the notification that the data transaction event has occurred.

10. The method of claim 8, wherein detecting that the data transaction event has occurred further comprises:

monitoring a log associated with the data store; and determining from the log that the data transaction event has occurred.

11. The method of claim 8, further comprising:

generating a data identifier that identifies the subset of the data by indicating a name or location of an object or file involved in the data transaction event; and assigning the data identifier to the transaction data subset.

12. The method of claim 8, further comprising:

identifying metadata associated with the transaction data subset; and linking the metadata to the transaction data subset.

13. The method of claim 12, wherein identifying the metadata associated with the transaction data subset further comprises:

identifying a user account that initiated the data transaction event; and including an identity of the user account in the metadata.

14. The method of claim 12, wherein identifying the metadata associated with the transaction data subset further comprises:

identifying a destination data store for the data in the transaction data subset; and including an identifier of the destination data store in the metadata.

15. A non-transitory, computer-readable medium, comprising machine-readable instructions that, when executed by a processor of a computing device, cause the computing device to at least:

detect that a data transaction event has occurred at a data store;

identify data involved in the data transaction event at the data store;

assign a trace identifier to the data involved in the data transaction event, wherein the trace identifier uniquely identifies a transaction event record with respect to other transaction event records;

identify a transaction data subset, the transaction data subset representing a subset of the data involved in the data transaction event that is subject to a common data processing event;

assign a span identifier to the transaction data subset, wherein the span identifier uniquely identifies the transaction data subset with respect to other transaction data subsets;

link a correlation identifier to a combination of the span identifier and the trace identifier;

search a distributed ledger for the transaction data subset to identify a previous span identifier and a previous trace identifier;

identify a correlation record based on the previous span identifier and the previous trace identifier;

write the transaction event record to the distributed ledger that is globally accessible by a user, the transaction event record comprising the trace identifier and the transaction data subset; and write or update the correlation record at the distributed ledger, the correlation record comprising the correlation identifier, the previous span identifier, the span identifier, the previous trace identifier, and the trace identifier, wherein the correlation record is configured to maintain a history of operations performed on the transaction data subset across different data stores.

16. The non-transitory, computer-readable medium of claim 15, wherein the machine-readable instructions that cause the computing device to detect that the data transaction event has occurred further cause the computing device to at least:

receive, through an application programming interface or a message passing interface provided by the machine-readable instructions, a notification from a data store or an application accessing the data store; and determine from the notification that the data transaction event has occurred.

17. The non-transitory, computer-readable medium of claim 15, wherein the machine-readable instructions that cause the computing device to detect that the data transaction event has occurred further cause the computing device to at least:

monitor a log associated with the data store; and determine from the log that the data transaction event has occurred.

18. The non-transitory, computer-readable medium of claim 15, wherein the machine-readable instructions further cause the computing device to at least:

generate a data identifier that identifies the subset of the data by indicating a name or location of an object or file involved in the data transaction event; and assign the data identifier to the transaction data subset.

19. The non-transitory, computer-readable medium of claim 15, wherein the machine-readable instructions further cause the computing device to at least:

identify a user account that initiated the data transaction event; and include an identity of the user account in metadata for the transaction data subset included in the transaction event record.

20. The non-transitory, computer-readable medium of claim 15, wherein the machine-readable instructions further cause the computing device to at least:

identify a destination data store for the data in the transaction data subset; and include an identifier of the destination data store in metadata for the transaction data subset included in the transaction event record.

\* \* \* \* \*